April 28, 1959   M. A. SHOFFNER   2,883,938
APPARATUS FOR CONVERTING MOTION
Filed Oct. 16, 1953   7 Sheets-Sheet 1

INVENTOR.
Myron A. Shoffner
BY
HIS ATTORNEYS

April 28, 1959   M. A. SHOFFNER   2,883,938
APPARATUS FOR CONVERTING MOTION
Filed Oct. 16, 1953   7 Sheets-Sheet 2

INVENTOR.
Myron A. Shoffner
BY
HIS ATTORNEYS

April 28, 1959 M. A. SHOFFNER 2,883,938
APPARATUS FOR CONVERTING MOTION
Filed Oct. 16, 1953 7 Sheets-Sheet 4

Fig.10

INVENTOR.
Myron A. Shoffner
BY
HIS ATTORNEYS

April 28, 1959

M. A. SHOFFNER

2,883,938

APPARATUS FOR CONVERTING MOTION

Filed Oct. 16, 1953

INVENTOR.
Myron A. Shoffner
BY
HIS ATTORNEYS

April 28, 1959 M. A. SHOFFNER 2,883,938
APPARATUS FOR CONVERTING MOTION
Filed Oct. 16, 1953 7 Sheets-Sheet 6

INVENTOR.
Myron A. Shoffner
BY
HIS ATTORNEYS

INVENTOR.
Myron A. Shoffner

United States Patent Office 2,883,938
Patented Apr. 28, 1959

2,883,938
APPARATUS FOR CONVERTING MOTION
Myron A. Shoffner, Kittanning, Pa.
Application October 16, 1953, Serial No. 386,594
14 Claims. (Cl. 103—157)

The present invention relates to apparatus for converting rectilinear motion to rotary motion and vice versa, and especially to a pump and hydraulic motor which in the preferred form have a reversible operation.

In many industrial operations, it is necessary to convert rectilinear motion to rotary motion or vice versa. For example, rotary motion is often needed for digging, drilling, and the like. One specific instance is in the mining of coal where a rotating auger bores into a wall of a mine to fracture the coal from its bed in lumps of removable size. In machines presently used for this purpose, the auger is driven directly from an engine, such as a diesel engine, through a transmission and gear reducer. When the auger strikes a material harder than coal, for example rock or sulphur balls, a damaging shock wave is transmitted throughout the entire system. Moreover, at this time the momentum of the engine is often sufficient to break the stalled output shaft of the transmission.

The apparatus of this invention for converting rectilinear motion to rotary motion or vice versa may be utilized either as a pump or a hydraulic motor and as such has many versatile uses. In particular, when employed as a hydraulic motor, the apparatus is readily adapted to the described mining operation and similar applications. For instance, the hydraulic motor of this invention can be stalled under load without damage and provides a high torque at low speed. Further, the present apparatus may be made reversible so that in the case of the motor rotary motion can be supplied either in a clockwise or counter-clockwise direction, or in the case of the pump the direction of fluid flow can be reversed.

In one form, the invention includes a shaft having a camming member and a casing for the shaft having a cam disposed on each side of the camming member. The shaft and the cams are adapted for relative axial movement so that upon effecting the movement of one with respect to the other, the cam member alternatively engages the cams and imparts a motion to the shaft. The parts are so arranged that if rectilinear motion is applied, rotary motion results and vice versa. More particularly, if the apparatus is used as a motor, rectilinear motion is applied to obtain a desired rotary motion; while if the apparatus is used as a pump, either rectilinear or rotary motion may be applied to obtain the pumping action. By employing a plurality of cam members on the shaft and offsetting the effect of the cams associated with adjacent camming members, the action of either the motor or the pump may be reversed by simply reversing at any instantaneous moment the direction of the applied rotary or rectilinear motion.

The accompanying drawings illustrate several embodiments of the present apparatus wherein.

Structure

Figure 1:
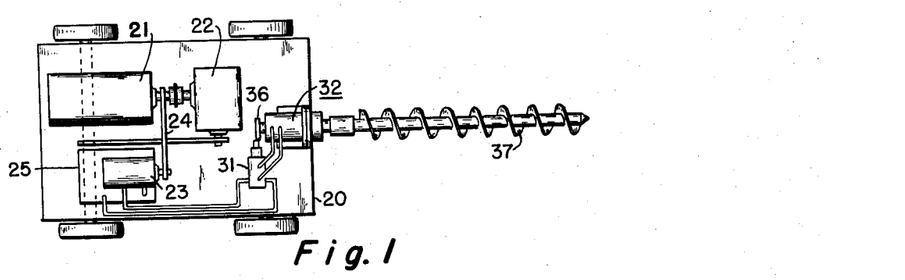
Figures 1 and 2 are plan and side elevations, respectively, of a coal mining machine using the present apparatus as a hydraulic motor.
Figure 2:
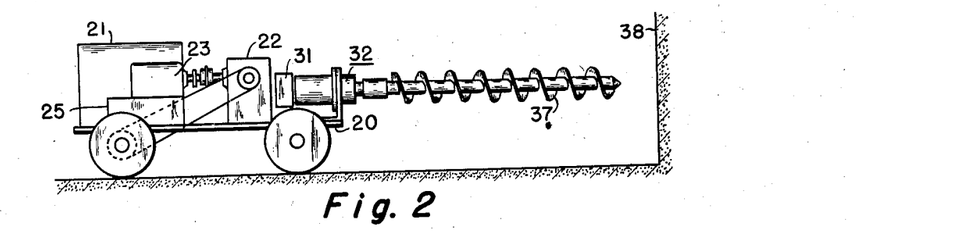
Figure 3:
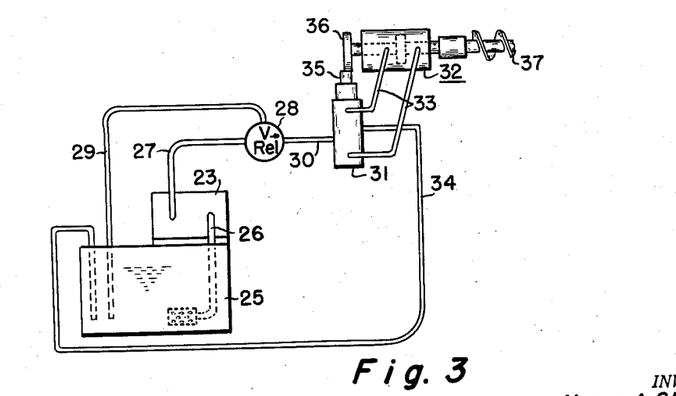
Figure 3 is a schematic illustration of a hydraulic system which may be used with this motor.

The apparatus may be embodied in a coal mining machine as illustrated in Figures 1, 2 and 3. This machine includes a supporting carriage 20 carrying a diesel engine 21. The engine propels the carriage through a right angle gear reducer 22 by a conventional sprocket and chain arrangement as shown and may also be provided with a suitable clutch for this purpose. The engine 21 also drives a standard hydraulic pump 23 by the belt 24.

The pump 23 draws hydraulic fluid from a reservoir 25 through a line 26 and advances it through line 27 to a relief valve 28 which has a drain line 29. From the valve 28, the hydraulic fluid flows through line 30 to a four-way spring-return valve 31 of standard construction. The latter directs the fluid to the present hydraulic apparatus, generally shown at 32, alternatively through one of the two supply lines 33 while receiving discharged fluid through the other. The line 34 returns the fluid to the reservoir 25. The direction of fluid flow at any given instant in the supply lines 33 depends on the position of the valve stem 35 which is actuated by a cam wheel 36 in conjunction with the operation of the hydraulic apparatus 32 as hereinafter explained. The hydraulic apparatus 32 rotates an auger 37 into a wall of coal 38.

Referring now to Figures 4 through 9, one form of the present apparatus includes a shaft 39 adapted for axial movement in a casing 40. The shaft has a camming member in the form of a disc 41 secured thereto, while the casing has annular stationary cams 42 and 43 which seal the ends thereof and receive the shaft through their central openings. The disc 41 has a camming surface on each side comprising radially spaced-apart projections 44 having conical surfaces 45 with the apices thereof pointed radially inwardly. The camming surface of each stationary cam includes radial recesses 46 opposing the projections 44 and adapted to receive them. The recesses also have conical surfaces substantially complementary to the camming surfaces of the projections, but the former have a wider base and the sides of adjacent recesses intersect as at 47 on the outer periphery of the stationary cam.

Figure 4:
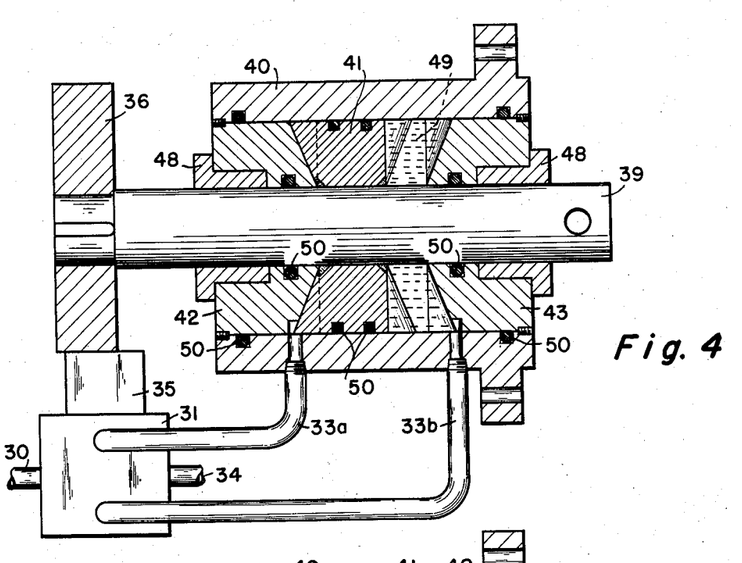
Figures 4 and 5 are longitudinal sections through one form of the present apparatus showing different positions of the shaft.
Figure 5:
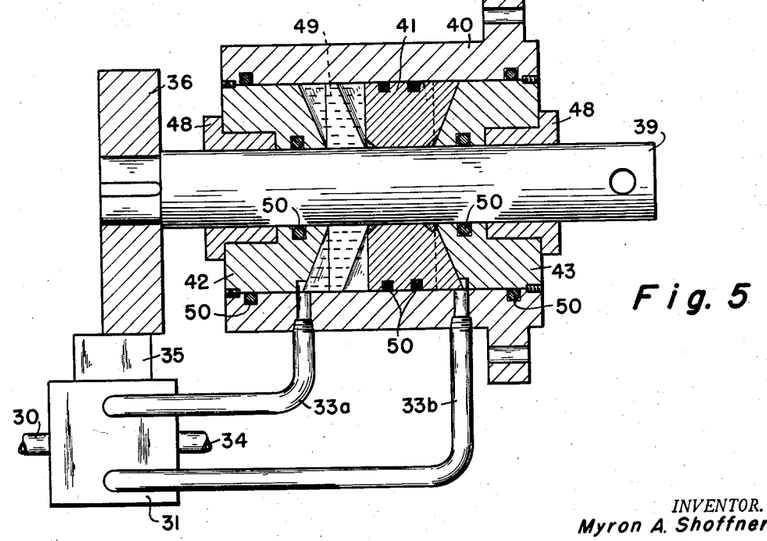

Bearings 48 inserted in the openings of the cams 42 and 43 support the shaft for rotation. A hydraulic fluid 49 fills the casing, and suitable sealing rings 50 form a fluid-tight seal between the designated parts to prevent leakage. Conduits 33a and 33b connect a four-way spring-return valve 31 to the casing through an opening on each side of the disc. A fluted cam wheel 36 secured to an extension of the shaft 39 operates the valve stem 35 of the valve 31 in accordance with the rotary position of the shaft.

Figure 10:
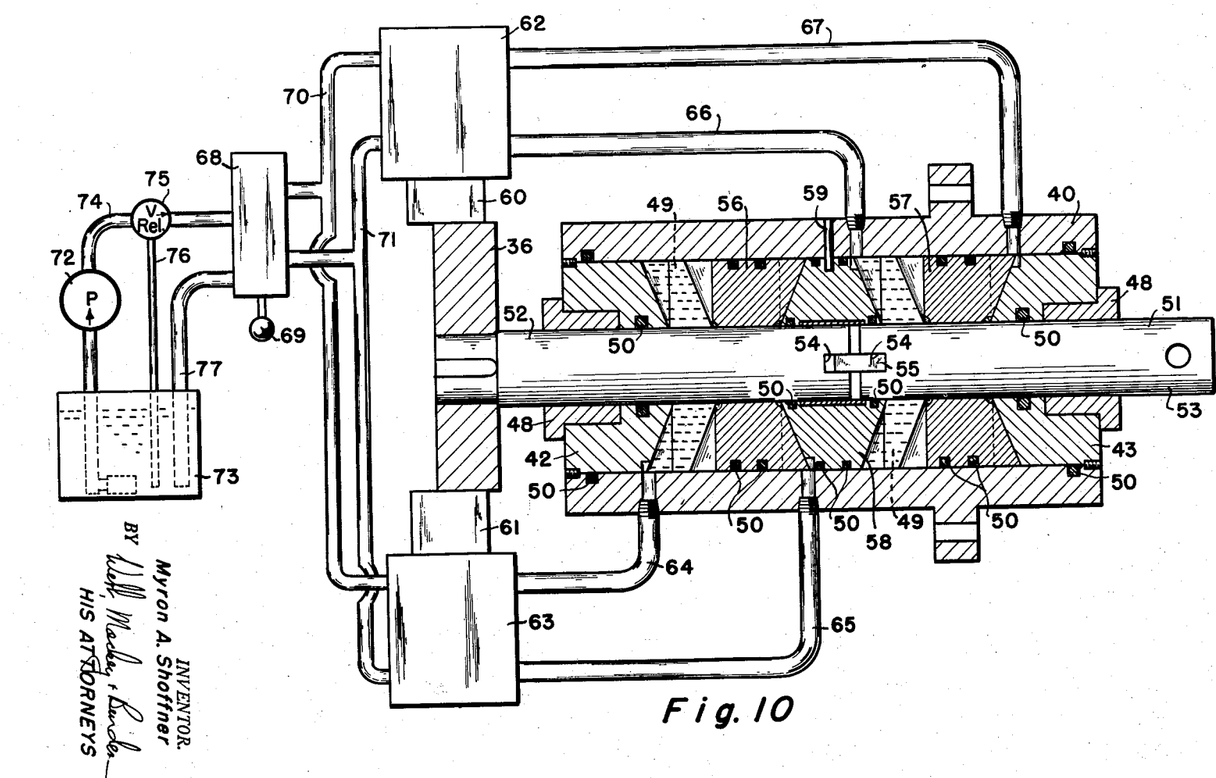
Figure 10 is a longitudinal section through apparatus similar to that of Figures 4 and 5 but adapted for reversibility.

Figure 10 illustrates how the apparatus of Figures 4 and 5 may be modified to obtain reversible operation. Parts similar to the two embodiments have like reference numbers. In this embodiment, the shaft 51 is split into two portions 52 and 53 having slots 54 at their adjacent ends. A key 55 fits in both slots simultaneously so that the portions 52 and 53 are adapted for joint rotation but individual axial movement. Discs 56 and 57 similar in construction to disc 41 are secured to each portion, and a central stationary cam 58 is placed therebetween and secured to the casing 40 as by a dowel pin 59. The center cam 58 is similar in construction to the end cams 42 and 43 except that it has camming surfaces on both sides. Cam 58 is also adapted to allow axial movement of the shaft 51 and provided with sealing rings 50. The camming surfaces associated with each disc are offset or staggered with respect to each other and preferably also with respect to the camming surfaces associated with the adjoining disc to obtain the reversible operation as hereinafter explained.

A cam wheel 36 operates the valve stems 60 and 61 of two four-way spring-return valves 62 and 63, respectively, according to the rotary position of the shaft as before. Conduits 64 and 65 connect valve 63 to the casing through an opening on each side of the disc 56, while conduits 66 and 67 similarly connect valve 62 to each side of the disc 57. Another four-way valve 68 operated by the hand lever 69 has two manifold lines 70 and 71 each of which joins valves 62 and 63 to the valve 68. A standard hydraulic pump 72 circulates hydraulic fluid from a reservoir 73 to the valve 68 through a feed line 74 having a relief valve 75 and a drain line 76. Line 77 returns the fluid to the reservoir. The four-way valves are of conventional construction being adapted to discharge through either auxiliary exit line associated therewith while receiving through the other and finally to discharge through the main exit line. Valves 62 and 63 may also have a neutral setting wherein there is no action. Additionally, valves 62 and 63 are positioned radially about the cam wheel 36 so that the action of each overlaps the other as hereinafter described. Or the valves 62 and 63 may be stationed diametrically across a cam wheel which is then designed to operate the valve in the overlapping fashion mentioned.

Figures 11 through 14 illustrate a further modification of the present apparatus. This embodiment may be used in the same manner as the embodiment of Figure 10 and therefore the valves, conduits, cam wheel, and the like are not shown, their presence being understood. In this case, a shaft 78 has no axial movement but is mounted for rotation in a casing 79 having for this purpose fixed end flanges 80 and 81 which engage the sides of ball bearings 82. The casing has an annular rim 83 to divide the enclosed area about the shaft into two sections 84 and 85. Suitable conduit joins each section through openings 86 to valves as previously disclosed. The shaft 78 has three pairs of radially disposed camming members 87 in each section, each pair being stationed about 120 degrees apart. Each camming member includes a bolt 88 radially threaded into the shaft, a collar 89 about the bolt, a tapered bearing 90 having its inner race in a tight fit with the collar, and a ring 91 making a tight fit with the outer race of the bearing. Flanges 92 and 93 prevent axial movement of the assembly with respect to the bolt 88.

Figure 11:
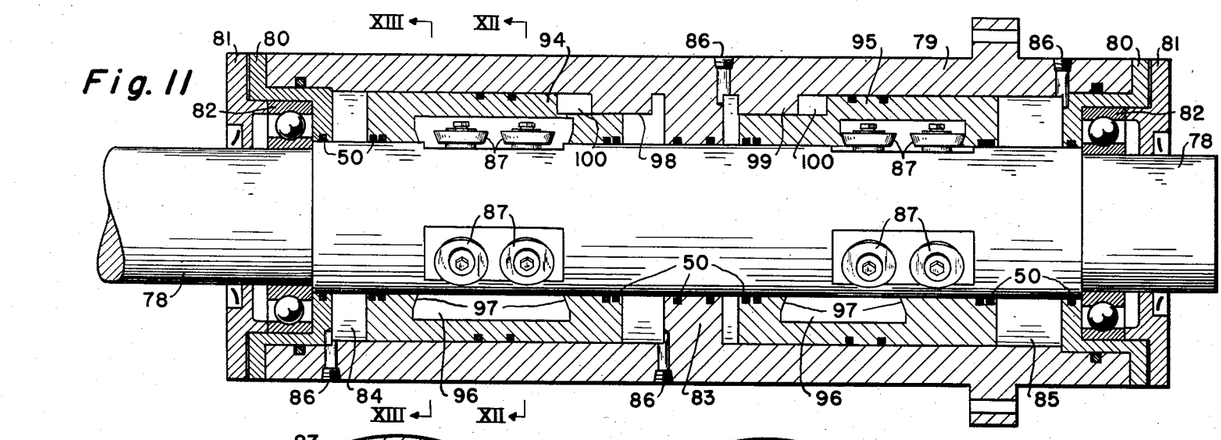
Figure 11 is a longitudinal section through another modified form of the present apparatus.
Figure 12:
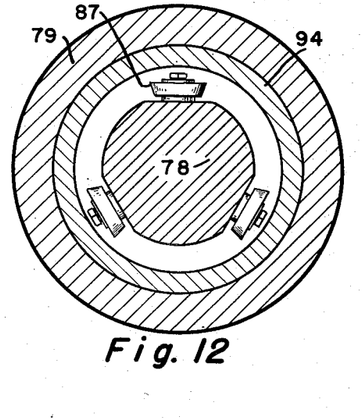
Figures 12 and 13 are sections of Figure 11 on the lines XII—XII and XIII—XIII, respectively.
Figure 13:
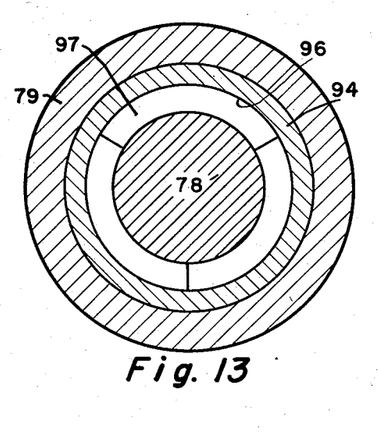
Figure 14:
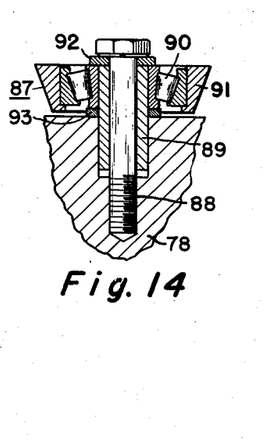
Figure 14 is a fragmentary side elevation of a camming member of the apparatus of Figure 11.

Sections 84 and 85 also have annuli or pistons 94 and 95, respectively, which are adapted for movement along the shaft. Each piston has an annular groove 96 the sides of which form camming surfaces 97 to engage the ring 91 on the camming member 87. The camming surfaces in each section are offset or staggered with respect to each other and also with respect to the camming surfaces in the adjoining section. The pistons make a much tighter fit with the casing 79 than the easily rotatable shaft 78 makes with its bearings, so that in operation the shaft always rotates much more with respect to the casing than the piston does if the latter rotates at all. However, to increase efficiency of operation and to insure no rotary movement of the pistons, the casing 79 may have integral lugs 98 and 99 in sections 84 and 85, respectively, which engage recesses 100 in the corresponding pistons 94 and 95. If desired, the sides of the recesses 100 may be provided with needle bearings to facilitate the sliding engagement of the lugs with the recesses.

Although the embodiment of Figure 11 has been illustrated as adapted for reversibility, it is also possible to use this form of the present apparatus with just one piston as in the manner of the apparatus of Figures 4 and 5.

Operation

Considering first the apparatus of Figures 4 and 5 when used as a hydraulic motor, hydraulic pressure is applied to valve 31 through the line 30 as by the hydraulic system shown in Figure 3. Either conduit 33a or 33b will be open to transmit the flow of hydraulic fluid, while the other is open to the exit or return line 34. Assuming that the cam wheel 36 has depressed the valve stem 35 and this position opens the line 30 to conduit 33b, hydraulic fluid enters the casing and forces the disc 41 and shaft 39 to the left as illustrated in Figure 4. This motion expels the hydraulic fluid out the opening on the other side of the disc through conduit 33a to the valve 31 and then out the return line 34.

Figure 15:
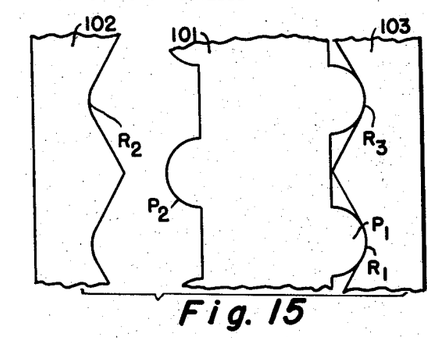
Figures 15, 16 and 17 are progressive views schematically illustrating how in the apparatus of Figures 4 and 5 a projection of a disc moves from a recess of one cam to a recess of another during axial movement of the shaft.
Figure 16:
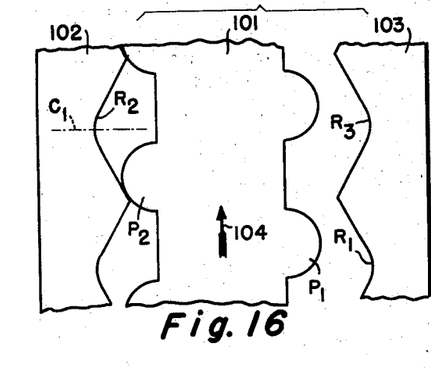
Figure 17:
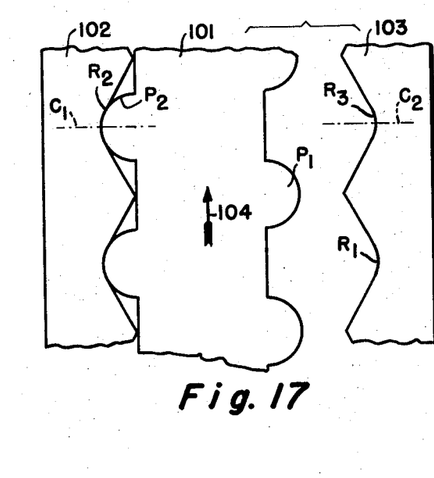

The disc 41 continues to move to the left until it engages the stationary cam 42 when a rotary motion is imparted to the shaft 39 in the manner illustrated by Figures 15, 16 and 17. Figure 15 shows the relation of a disc 101 to stationary cams 102 and 103 when a shaft to which the disc is secured is at its farthest axial movement to the right and before the hydraulic fluid enters the casing on the right side of the disc. At this time projection $P_1$, for example, is seated in the recess $R_1$. When the hydraulic fluid enters the casing and forces the disc and shaft to the left as described, projection $P_2$ on the other side of the disc 101 enters recess $R_2$ below its middle or center line represented by the broken line $C_1$ in Figure 16. Since the hydraulic fluid continues to exert a pressure to the left, projection $P_2$ seeks the bottom of recess $R_2$ sliding along its conical surface until it is seated as represented in Figure 17. This motion imparts a rotary thrust to the disc 101 and the shaft to which it is secured in the direction of the arrow 104 thereby bringing the first mentioned projection $P_1$ above the recess $R_1$ and opposite the recess $R_3$. If desired, conventional means such as a flywheel may be used to provide rotary inertia for the shaft if needed and to carry the disc through a small arc to insure that a projection such as $P_1$ is within the ambit of the next recess such as $R_3$.

The rotary motion imparted to the shaft also turns the cam wheel 36 to a shallow portion on its periphery. This allows the spring-return valve 31 to extend the stem 35 outwardly, thereby switching the conduit 33a to the hydraulic pressure of line 30 and switching the conduit 33b to the return line 34. The hydraulic fluid now enters the casing on the left side of the disc 41 in Figure 4 expelling the discharge fluid out the conduit 33b and then out valve 31 and line 34 as before. This fluid flow, in turn, forces the disc 41 to the right as shown in Figure 5 where it engages the stationary cam 43. Therefore, with reference again to Figure 17, in the reverse movement the projection $P_1$ enters the recess $R_3$ below its center line represented by the broken line $C_2$ and once more imparts a rotary thrust to the disc 101 in the direction of arrow 104 as the projection P₁ seats itself in that recess. Thereafter, the procedure as described is repeated to provide a continuous rotary motion.

Figure 6:
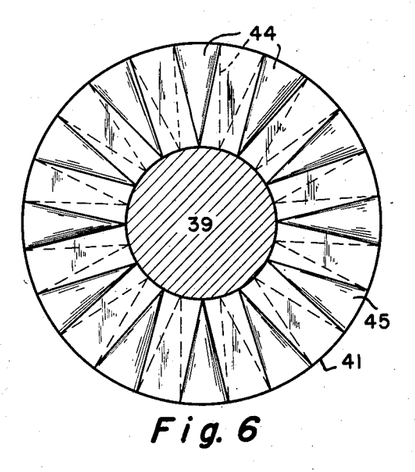
Figures 6 and 7 are front and side elevations, respectively, of a disc used with the apparatus of Figures 4 and 5.
Figure 7:
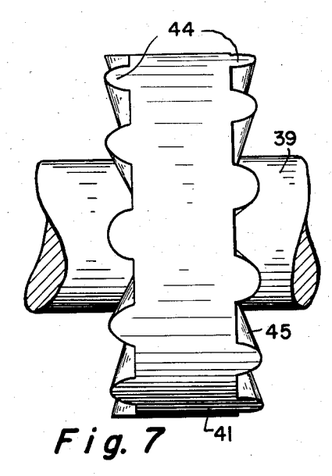
Figure 8:
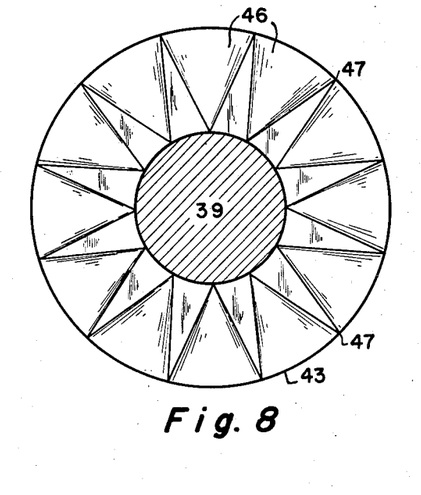
Figures 8 and 9 are front and side elevations, respectively, of a stationary cam used with the same apparatus.
Figure 9:
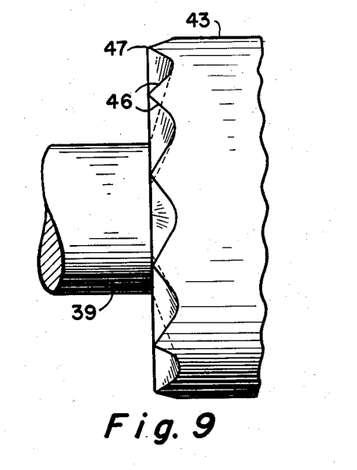

In order to facilitate the transmission of a projection from one recess to another, the projections are spaced apart with flat areas in-between as shown in Figure 6, while the recesses have their adjoining sides intersect at 47 on the outer periphery of each stationary cam as shown in Figure 8. This also results in a wider base for the recesses than for the projections and enables the latter to slide readily along the conical surfaces of the recesses in moving to the bottoms thereof as described. Consequently, when a projection is finally seated in a recess, there are slight openings on either side of a projection as shown in Figures 15 and 17. This mating of the designated parts is termed herein and in the claims as "substantially complementary."

Figure 18:
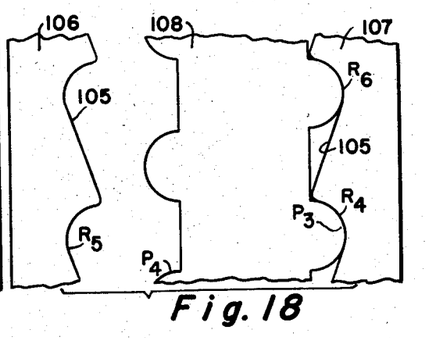
Figures 18, 19 and 20 are progressive views similar to those of Figures 15, 16 and 17 showing a modified structure for the disc and cams.
Figure 19:
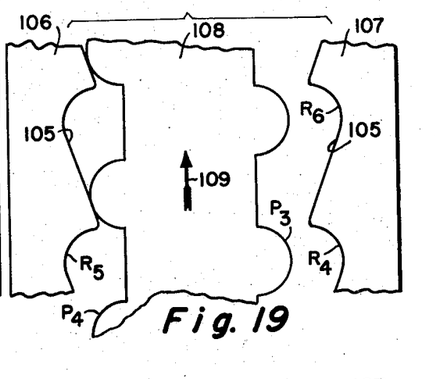
Figure 20:
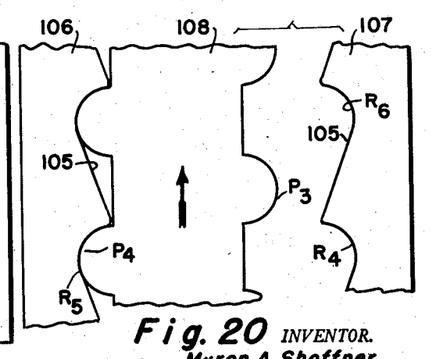

A more positive rotary thrust is obtained by the structure shown in Figures 18, 19 and 20. In this case, the recesses 105 of the stationary cams 106 and 107 slant in the same direction to form the deepest portion adjacent an edge of the recess. Accordingly, as projection P₃, for instance, of the disc 108 leaves recess R₄ under the hydraulic pressure, projection P₄ is easily caught by recess R₅ and positively thrust in the direction of the arrow 109 as the projection moves to the bottom of that recess. This brings projection P₃ above the recess R₄ and opposite recess R₆. The action during movement in the opposite direction is the same as that described in connection with Figures 15, 16 and 17.

Figure 21:
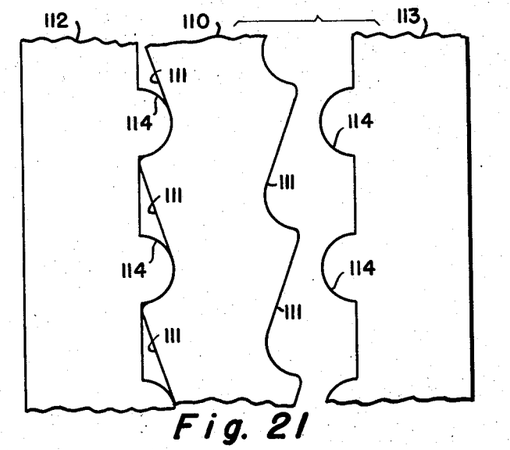
Figure 21 illustrates a further modified structure for the disc and cams.

Figure 21 illustrates that the camming surfaces may be reversed. In this case a disc 110 has recesses 111, while stationary cams 112 and 113 have projections 114.

When the apparatus of Figures 4 and 5 is used as a pump, the hydraulic fluid becomes that which is propelled. Either rectilinear or rotary motion may be used. If rectilinear motion is applied, the shaft 39 is mechanically reciprocated in an axial direction thereby rotating the disc 41 in the manner just described. If rotary motion is applied, the shaft thereby moves the projections of the disc in and out of the recesses of the stationary cams which, because of the described camming surfaces of each, impart a reversible axial movement to the shaft. In either case, the resulting mechanical action draws the fluid to be pumped through the line 30 and valve 31 into either conduit 33a or conduit 33b and forces the discharge out the other conduit through the valve 31 and out the line 34. This action also turns the cam wheel 36 so that on the return stroke, effected by either the rectilinear or rotary motion, the action in the conduits 33a and 33b is reversed to provide a continuous pumping action.

Considering now the reversible apparatus of Figures 10 and 11, the discs 56 and 57 and the pistons 94 and 95 engage the camming surfaces associated therewith in a manner similar to that already described. Reversibility is possible in these embodiments because of the use of more than one disc or piston and the ability of the discs or pistons to move independently of each other. Accordingly, the discs or pistons may be individually controlled by the four-way valves 62 and 63 whose operations overlap as previously mentioned.

For instance, referring to Figure 10, with the hand lever 69 in a position wherein line 70 is connected to the feed line 74 and line 71 is connected to the return line 77, the sequence of operation with respect to fluid flow when the apparatus is used as a hydraulic motor is as follows:

(1) In line 64, out line 65; no action in lines 66 and 67, valve 62 being in a neutral position.
(2) In line 64, out line 65; in line 66, out line 67.
(3) No action in lines 64 and 65; in line 66, out line 67.
(4) Out line 64, in line 65; in line 66, out line 67.
(5) Out line 64, in line 65; no action in lines 66 and 67.
(6) Out line 64, in line 65; out line 66, in line 67.
(7) No action in lines 64 and 65; out line 66, in line 67.
(8) In line 64, out line 65; out line 66, in line 67.

If it is desired to reverse the direction of shaft rotation, all that is necessary is to operate the lever 69 at any instantaneous moment, so that line 71 is connected to the feed line 74 and line 70 is connected to the return line 77. This causes the discs or pistons to move in a direction opposite to that in which they were traveling at the moment the lever 69 was thrown, because the fluid flow now has this sequence;

(1) Out line 64, in line 65; no action in lines 66 and 67.
(2) Out line 64, in line 65; in line 66, out line 67.
(3) No action in lines 64 and 65; in line 66, out line 67.
(4) In line 64, out line 65; in line 66, out line 67.
(5) In line 64, out line 65; no action in lines 66 and 67.
(6) In line 64, out line 65; out line 66, in line 67.
(7) No action in lines 64 and 65; out line 66, in line 67.
(8) Out line 64, in line 65; out line 66, in line 67.

Figure 22:
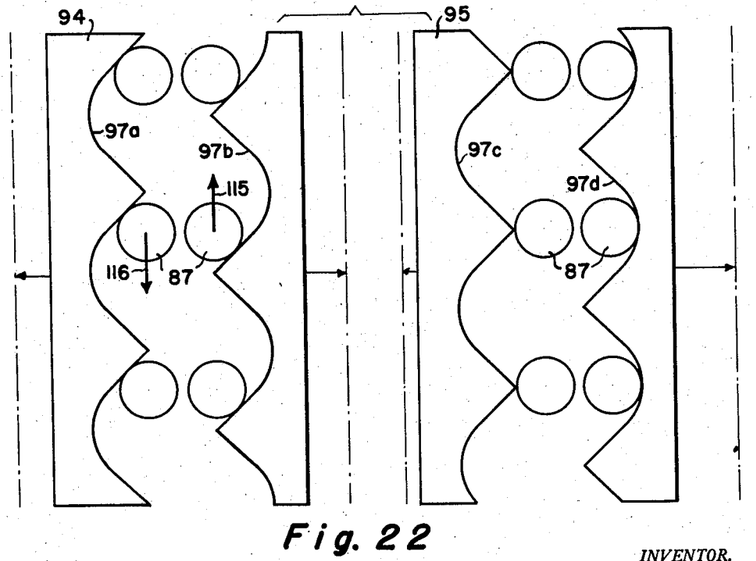
Figure 22 represents a 360 degree development of the camming members and surfaces of the apparatus of Figure 11.

As previously noted, the cams associated with each disc or piston are offset or staggered with respect to each other and preferably also with respect to the camming surfaces associated with an adjoining disc or piston. Figure 22 shows a 360 degree development of the camming surfaces and camming members of the apparatus of Figure 11. There may be any integral number of recesses equally spaced around the pistons. Therefore, assuming for convenience of disclosure here and in the claims that the curve representing one recess in Figure 22 signifies 120 degrees of motion, camming surfaces 97a and 97c are 60 degrees out of phase with camming surfaces 97b and 97d, respectively, while each camming surface is 30 degrees out of phase with each of the camming surfaces in the other section. The left-hand portion of Figure 22 illustrates how reversing the direction of movement of the piston 94 reverses the direction of shaft rotation. If the piston is moved to the left, the camming members 87 are thrust in the direction of the arrow 115, while if the piston is moved to the right the members are thrust in the direction of the arrow 116. The effect of the piston 95 in the right-hand portion of Figure 22 is accumulative and overlaps that of the left-hand portion in the sequence of operation as previously described.

When it is desired to use the apparatus of Figures 10 and 11 as pumps, rotary or the necessary rectilinear motion can be applied to shaft 53 or rotary motion to the shaft 78 to effect the pumping action as explained in conjunction with Figures 4 and 5. Further, by reversing the direction of the applied mechanical motion, the pumping action is completely reversed as in the case where the apparatus is used as a motor. The lever 69 may be thrown to make the lines 74 and 77 either intake or discharge lines as desired.

Additional modifications and other arrangements may be made than are here described, the present disclosure being merely illustrative and comprehending all variations thereof.

I claim:

1. Coal boring apparatus including a shaft having a plurality of first camming members, a casing for the shaft, second camming members stationed in the casing on each side of each first camming member, said second members for each first camming member and the shaft being adapted to individual relative movement wherein the second camming members slide axially without turning and the shaft turns without axial movement, anti-friction parts carried by one set of camming members to impart a rolling contact of engagement with the other set, and means including a flow controlling valve and a conduit connected to said casing to control the application of fluid pressure, said valve being operated in response to the turned position of the shaft.

2. Apparatus including a shaft having a plurality of radially disposed camming members, a casing for the shaft having associated therewith sets of second camming members comprising a camming member on each side of each radially disposed camming member, each set of said second members and the shaft being adapted to individual relative movement axially of the shaft whereby reciprocal axial movement of the shaft imparts a rotary motion to the shaft and vice versa by alternatively engaging the radially disposed camming member with the second camming members and wherein said rotary or axial movement of the shaft may be reversed by reversing the direction of said relative movement at any instantaneous moment.

3. Apparatus including a shaft comprising two portions having slots at their adjacent ends and a key to fit said slots whereby the portions are adapted for joint rotation and individual axial movement, a camming member on each portion, a casing for the shaft and members having a second camming member on each side of each of the first-mentioned camming members whereby the latter are alternatively engageable with the second camming members to impart a motion to the shaft and wherein said motion may be reversed by reversing the direction of said cam engagement.

4. A reversible hydraulic motor including a shaft comprising two portions having slots at their adjacent ends and a key to fit said slots whereby the portions are adapted for joint rotation and individual axial movement, a disc secured to each portion of the shaft and provided on both faces with radially extending projections, a casing forming a seal about the discs and the shaft and adapted to allow reversible axial movement of the said portions of the shaft, a cam on each side of each disc secured to the casing and having radially extending recesses shaped to receive the projections, the recesses of one cam being staggered with respect to those of the others, a hydraulic fluid filling the casing, and means to apply a pressure to the fluid alternatively on opposite sides of each disc to reciprocate the shaft portions axially whereby the projections are alternatively thrust from one staggered recess to another and in seeking the bottom of each recess impart rotation to the shaft, and whereby reversing the direction of said pressure application reverses the direction of shaft rotation.

5. A reversible hydraulic motor including in combination: a shaft comprising two portions having slots at their adjacent ends and a key to fit said slots whereby the portions are adapted for joint rotation and individual axial movement, a disc secured to each portion provided on both faces with radially extending projections having conical surfaces with the apices thereof pointed inwardly, a casing forming a seal about the discs and the shaft and adapted to allow reversible axial movement of the shaft portions therein, an annular cam stationed on each side of each disc provided with radially extending recesses having conical surfaces to receive the projections, the recesses of one cam being staggered with respect to those of the others, a hydraulic fluid completely filling the casing, and means to apply hydraulic pressure to the fluid alternatively on opposite sides of each disc to reciprocate the shaft portions axially whereby the projections are forced from the recesses of one cam into the staggered recesses of an opposing cam and in seeking the bottoms of the recesses being entered impart rotation to the shaft and whereby reversing the direction of said hydraulic pressure application at any instant reverses the direction of shaft rotation.

6. A reversible hydraulic motor having a high torque including in combination: a shaft comprising two aligned portions having slots at their adjacent ends and a key to fit in both slots simultaneously whereby the portions are adapted for joint rotation and individual axial movement, a disc secured to each portion provided on both sides with spaced-apart projections which extend radially from the shaft and have conical surfaces with the apices thereof pointed inwardly, a casing forming a fluid-tight seal about the discs and the shaft portions and adapted to allow reversible axial movement of the shaft portions therein, an annular cam on each side of each disc having a fixed position with respect to the casing and provided with radially extending recesses opposing said projections to receive the same, said recesses having conical surfaces of a wider base than the conical surfaces of the projections, the recesses of the cams associated with one disc being about 90 degrees out of phase with each other and also staggered with respect to the recesses of the cams associated with the other disc, a hydraulic fluid completely filling the casing, said casing having an opening on each side of each disc, a pair of disc-control valves each for controlling a different one of said discs and each having conduits connecting that valve to the openings associated with the disc controlled thereby and means to operate the valves whereby a hydraulic fluid under pressure is alternatively applied to opposite sides of each disc through said openings to reciprocate the shaft axially whereby the projections are forced from the recesses of one cam into the staggered recesses of an opposing cam and in seeking the bottoms of the recesses being entered impart rotation to the shaft and whereby reversing the direction of said hydraulic pressure application at any instant reverses the direction of shaft rotation.

7. A reversible hydraulic motor having a high torque at low speed and adapted to stall under load without damage including in combination: a shaft comprising two aligned portions having slots at their adjacent ends and a key to fit in both slots simultaneously whereby the portions are adapted for joint rotation and individual axial movement, a disc secured to each portion provided on both faces with spaced-apart projections which extend radially from the shaft and have conical surfaces with the apices thereof pointed inwardly, a casing forming a fluid-tight seal about the discs and the shaft portions and adapted to allow reversible axial movement of the shaft portions therein, an annular cam on each side of each disc having a fixed position with respect to the casing and provided with radially extending recesses opposing said projections to receive the same, said recesses having conical surfaces of a wider base than the conical surfaces of the projections, the sides of adjacent recesses intersecting at the outer periphery of each cam, the recesses of the cams associated with one disc being about 90 degrees out of phase with each other and the two middle cams being about 45 degrees out of phase with each other, a hydraulic fluid completely filling the casing, said casing having an opening on each side of each disc, a pair of disc-control valves each for controlling a different one of said discs and each having conduits connecting that valve to the openings associated with the disc controlled thereby, and a cam wheel secured to a portion of the shaft not enclosed by the casing adapted to operate said valves depending on the rotary position of the shaft whereby a hydraulic fluid under pressure is alternatively applied through the valves to opposite sides of each disc through said openings to reciprocate the shaft axially whereby the projections are forced from the recesses of one cam into the staggered recesses of an opposing cam and in seeking the bottoms of the recesses being entered impart rotation to the shaft and whereby reversing the direction of said hydraulic pressure application at any instantaneous moment reverses the direction of shaft rotation.

8. A reversible pump including a shaft comprising two portions having slots at their adjacent ends and a key to fit said slots whereby the portions are adapted for joint rotation and individual axial movement, a radially disposed camming member on each portion, a casing for the shaft having an opening on each side of each radially disposed member, and a cam disposed on each side of each of said members, whereby rotating the shaft produces a reversible axial movement of the shaft and vice versa by alternatively engaging the radially disposed members with the cams resulting in an alternate intake and discharge action at the openings and whereby reversing the direction of the motion applied to the shaft reverses the timing of said intake and discharge actions.

9. A reversible pump including in combination: a shaft comprising two portions having slots at their adjacent ends and a key to fit the slots whereby the portions are adapted for joint rotation and individual axial movement, a radially disposed member secured to each portion having camming surfaces on both faces, a casing enclosing the shaft, a stationary cam on each side of each member having a camming surface which is substantially complementary to a camming surface on the member, a pair of member-control valves each for controlling a different one of said radially disposed members and each having conduits connecting that valve to the interior of the casing on each side of the radially disposed member controlled thereby and beyond the extent of its axial movement, each valve having an entrance and exit which are adapted to be alternatively connected to the conduits associated therewith whereby rotating the shaft produces a reversible axial movement of the shaft and vice versa by alternatively engaging radially disposed members with the stationary cams resulting in an intake action at the entrances of the valves and a discharge action at the exits and whereby reversing the direction of the motion applied to the shaft reverses said actions at the entrances and exits of the valves.

10. Coal boring apparatus including a shaft having pluralities of radially disposed camming members, a piston disposed about each plurality of members having camming surfaces to engage the same from opposite sides and being staggered with respect to the camming surfaces on another piston, a casing for the shaft and pistons, said pistons being adapted to move axially and said shaft turning without axial movement wherein the resulting movement causes the camming members and surfaces to transmit one motion through conversion into a different motion, and means including a flow controlling valve responsive to the turned position of the shaft and a conduit containing said valve and connected to said casing for controlling the application of fluid pressure therein.

11. A reversible hydraulic motor for driving augers and the like including a shaft having pluralities of radially disposed camming members carrying anti-friction parts, pistons concentric with the shaft each having an annular groove straddling a plurality of said camming members, the sides of each groove having camming surfaces to engage said anti-friction parts carried by said members, said surfaces being staggered with respect to each other, a casing for the shaft and pistons, said pistons being adapted to move axially of the shaft, and means responsive to the rotary position of the shaft to apply a hydraulic pressure alternatively on opposite sides of each piston comprising an automatically operable valve and conduits communicatively connecting said valve to said casing.

12. A pump including a shaft having radially disposed camming members, a plural piston means enclosing different sets of the members and having staggered camming surfaces to engage them from opposite sides, a casing for the shaft and plural piston means having an opening at each of the opposite sides of the piston means, said piston means being separately adapted to move axially of the shaft whereby rotating the shaft produces a reversible axial movement of the piston means by alternatively engaging the camming member with the camming surfaces of the piston means resulting in an alternate intake and discharge action at the openings a valve having an entrance and exit connected across the openings, and means responsive to the rotary position of the shaft to apply the intake action at the entrance of the valve and the discharge action at the exit of the valve.

13. A reversible pump including a shaft having pluralities of radially disposed camming members, pistons concentric with the shaft each having an annular groove arranged to straddle a plurality of the camming members with the sides of the groove having camming surfaces in engagement therewith, said surfaces being staggered with respect to each other, a casing for the shaft and pistons, said pistons being adapted to move axially of the shaft, a valve for each piston, conduits connecting said valve to the interior of the casing on each side of each piston beyond the extent of its axial movement, each valve having an entrance and exit which are adapted to be alternatively connected to the conduits associated therewith, and means responsive to the rotary position of the shaft to effect said connection of the conduits whereby rotating the shaft produces a reversible axial movement of the pistons by alternatively engaging the camming members with the staggered camming surfaces of the pistons.

14. Coal boring apparatus including a shaft having a camming member, a casing for the shaft, a second curved camming member in the casing on each side of said first camming member, said second camming members and the shaft being adapted to relative axial movement, means to correlate the rotary position of the shaft with said relative movement comprising a valve operated by turning the shaft and a fluid pressure conduit connecting said valve to said casing, and an anti-friction roller connecting the camming member on said shaft for operative engagement with a second curved camming member as aforesaid for smoothly converting pressure through the movement of the latter into shaft turning motion.

References Cited in the file of this patent

UNITED STATES PATENTS

| | | |
|---|---|---|
| 205,868 | Huston et al. | July 9, 1878 |
| 209,896 | Kendall | Nov. 12, 1878 |
| 416,147 | Edgerton | Nov. 26, 1889 |
| 1,404,625 | Marquet | Jan. 24, 1922 |
| 1,523,629 | Bullock | Jan. 20, 1925 |
| 1,833,501 | Schick | Nov. 24, 1931 |
| 2,316,107 | Ruben | Apr. 6, 1943 |
| 2,407,785 | Hoover | Sept. 17, 1946 |
| 2,447,416 | Mackal | Aug. 17, 1948 |
| 2,567,576 | Palumbo | Sept. 11, 1951 |

FOREIGN PATENTS

| | | |
|---|---|---|
| 65,815 | France | Jan. 12, 1865 |